(12) United States Patent
Duong (10) Patent No.: US 9,667,597 B2
(45) Date of Patent: May 30, 2017

(54) SYSTEM AND A METHOD FOR LOCATION BASED ANONYMOUS COMMUNICATION OVER A NETWORK

(71) Applicant: Phillip Duong, Rancho Cordova, CA (US)

(72) Inventor: Phillip Duong, Rancho Cordova, CA (US)

( * ) Notice: Subject to any disclaimer, the term of this patent is extended or adjusted under 35 U.S.C. 154(b) by 240 days.

(21) Appl. No.: 14/530,828

(22) Filed: Nov. 2, 2014

(65) Prior Publication Data
US 2015/0058939 A1 Feb. 26, 2015

(51) Int. Cl.
*G06F 15/16* (2006.01)
*G06F 17/30* (2006.01)
*H04L 29/06* (2006.01)
*H04L 12/58* (2006.01)

(52) U.S. Cl.
CPC .......... *H04L 63/0421* (2013.01); *H04L 51/20* (2013.01); *H04L 51/04* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,909,717 B2 * | 12/2014 | Khan | H04L 51/20 709/206 |
| 2010/0057872 A1 * | 3/2010 | Koons | G06Q 30/02 709/206 |
| 2010/0069058 A1 * | 3/2010 | Rothschild | H04W 76/02 455/422.1 |
| 2016/0021192 A1 * | 1/2016 | Passichenko | H04L 63/0428 713/168 |

\* cited by examiner

*Primary Examiner* — Kenny Lin (57) ABSTRACT

Disclosed is a system and method of location based anonymous communication in between plurality of users over a communication network. The system includes a registration module, a tapping module, a proximity module, an invitation module and a connection module. The registration module registers the credentials of the users. The tapping module receives touch gesture from the user in order to transmit a connection request. The proximity module displays a list of proximal users on receiving the connection request simultaneously from at least two users. The invitation module sends an invitation request to atleast one of the displayed proximal users for initiating the communication. The connection module establishes an anonymous connection for communication in between two users on receiving the invitation acceptance from one of proximal user.

16 Claims, 10 Drawing Sheets

SYSTEM AND A METHOD FOR LOCATION BASED ANONYMOUS COMMUNICATION OVER A NETWORK

CROSS REFERENCE TO RELATED APPLICATION

The present invention is a continuation in part application of the non-provisional application No. 61/869,465 filed on Aug. 14, 2014, which further claims priority of the provisional patent application No. 14/459,627 filed on Aug. 23, 2013; all of which are incorporated herein by reference in their entireties.

BACKGROUND OF THE INVENTION

1. Field of the Invention

The present invention generally relates to anonymous communication, and more particularly relates to a method and a system for a location based anonymous communication in between plurality of users over a communication network while keeping identities of the user anonymous.

2. Description of Related Art

Typically, the instant messaging systems available in the art provide the facility to communicate with friends or families over a network. The user connect to the server may invite other users to participate in a real-time text conversation by knowing the other user personally. Each user enters data into a text input box and then sends the data to other user. The users may add voice, video messages and images to the conversation. These instant messaging systems also works on various factors such as location of the users, type of messages to be transmitted, pricing based services etc.

Conventionally, location based messaging systems enable users to screen and check availability of other users in the proximity. The user must add other users to the contact list in order to communicate with the added users. This limits the scope or number of people that a user may communicate with restricting the user's instant messaging to only known users.

Further, other location based messaging systems allows receiving of chatting request from all users within the location. This results in receiving of unwanted chat requests from unknown users resulting in waste of time. Further such systems allow the connection only on revealing the personal contact information of the other user.

Additionally, many instant messaging services require users to have an email account with the instant messaging company. These systems are integrated with the services like GPS navigators which would help in showing all the nearby restaurants, shopping centers, and other facilities or services. Further these systems are focused on providing the user with information related to a particular area but these applications are not helpful in tracking people around the particular area.

Therefore there is a need of an instant messaging system that allow the users to meet new people without the need to ever exchange phone numbers or business cards. Further, there is also a need of the system that enables communication in between the multiple users based on the geographical location irrespective of the specific knowledge about the connected users.

SUMMARY OF THE INVENTION

In accordance with the teachings of the present invention, a method and a system of location based anonymous communication in between plurality of users over a communication network is provided.

An object of the present invention is to provide a system of location based anonymous communication in between plurality of users over a communication network includes at least one database for storing one or more instructions and at least one processing unit coupled with at least one of the database. The processing unit configured to execute one or more instructions stored in at least one of the database, the processing unit includes a registration module, a tapping module, a proximity module, an invitation module, and a connection module.

The registration module registers the credentials of the plurality of users. The tapping module receives the touch gesture from the user in order to transmit a connection request. The proximity module displays a list of proximal users on receiving the connection request simultaneously from at least two users. The invitation module sends an invitation request to atleast one of the displayed proximal user for initiating the communication. The connection module establishes an anonymous connection for communication in between two users on receiving the invitation acceptance from one of proximal user.

In another object of the present invention, the proximity module includes a selection module to select at least one user from the displayed list of the proximal users. In another object of the present invention, the system further includes a responding module to receive the response of the invitation request from the selected user. The responding module includes an accept module to accept the invitation request by the proximal user, and a decline module to decline the invitation request by the proximal user.

In another object of the present invention the system includes a messaging module to initiate the multimedia messaging in between the plurality of connected users. In another object of the present invention the system includes a proximal profile module to view the details of the connected proximal users. The details of the connected proximal users include a first name, an image, and meeting location of the connected users.

In another object of the present invention the system includes an attachment module to attach a multimedia file to the messaging module. In another object of the present invention the system includes a note module to create one or more notes by the user to note down the user related information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE DRAWINGS

While this technology is illustrated and described in a preferred embodiment, a system and a method for location based anonymous communication in between plurality of users over a communication network may be produced in many different configurations, forms and computer languages. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

Figure 1:
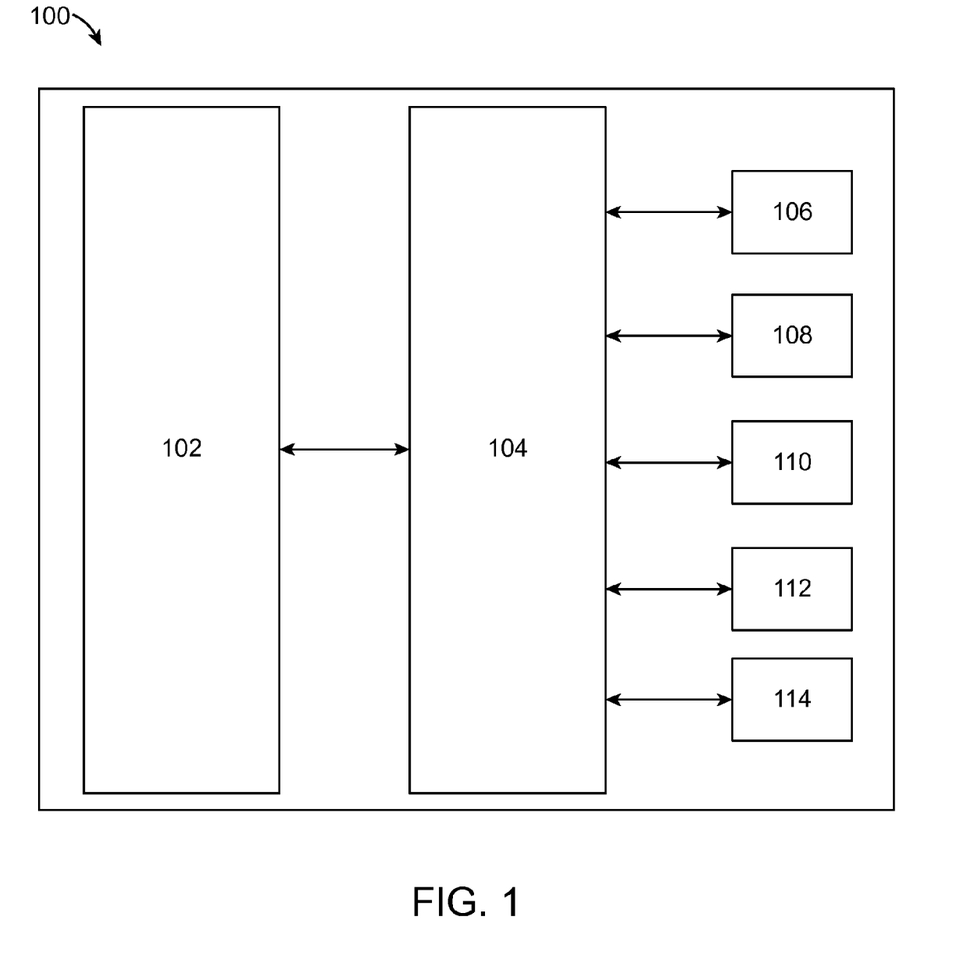
FIG. 1 illustrates a block diagram of a system for location based anonymous communication in between plurality of users over a communication network in accordance with a preferred embodiment of the present invention.

FIG. 1 illustrates a block diagram of a system for location based anonymous communication in between plurality of users over a communication network. The system 100 includes at least one database 102 for storing one or more instructions and at least one processing unit 104 coupled with the database 102. The processing unit 104 is configured to execute one or more instructions stored in the at least one database 102. The processing unit 104 includes a registration module 106, a tapping module 108, a proximity module 110, an invitation module 112 and a connection module 116.

The registration module 106 registers credentials of the users on the database 104. Examples of the database 104 includes but not limited to a central database, a cloud database or system library. The registration module 106 allows the users to register themselves by filling the required fields provided on the registration interface. The registration module 106 is explained in detail in conjunction with FIG. 3 of the present invention.

The tapping module 108 receives the touch gesture from the user in order to transmit a connection request. The touch gesture may be received by the user's finger or stylus. The tapping module 108 is explained in detail in conjunction with FIG. 4 of the present invention. The proximity module 110 displays the list of the proximal users on receiving the connection request simultaneously from at least two users. The proximity module 110 is explained in detail in conjunction with FIG. 5 of the present invention.

The invitation module 112 sends an invitation request to atleast one of the displayed proximal users for initiating the communication. In a preferred embodiment of the present invention, the invitation request is send via using communication network. The invitation module 112 is explained in detail in conjunction with FIG. 6 of the present invention.

The connection module 114 establishes an anonymous connection for communication in between atleast two users on receiving the invitation acceptance from atleast one of proximal user. In a preferred embodiment of the present invention, the connection is anonymous, meaning the information shared is minimal and the contact details are not shared. The connection module 114 is explained in detail in conjunction with FIG. 7 of the present invention.

In another preferred embodiment of the present invention, the system 100 further includes a proximal profile module (not shown in FIG. 1) to view details of the connected proximal users. The proximal profile module (not shown in FIG. 1) is explained in detail in conjunction with FIG. 8 of the present invention. The system 100 further includes a messaging module (not shown in FIG. 1) to initiate multimedia messaging in between the plurality of connected users. The messaging module (not shown in FIG. 1) is explained in detail in conjunction with FIG. 9 of the present invention.

Figure 2:
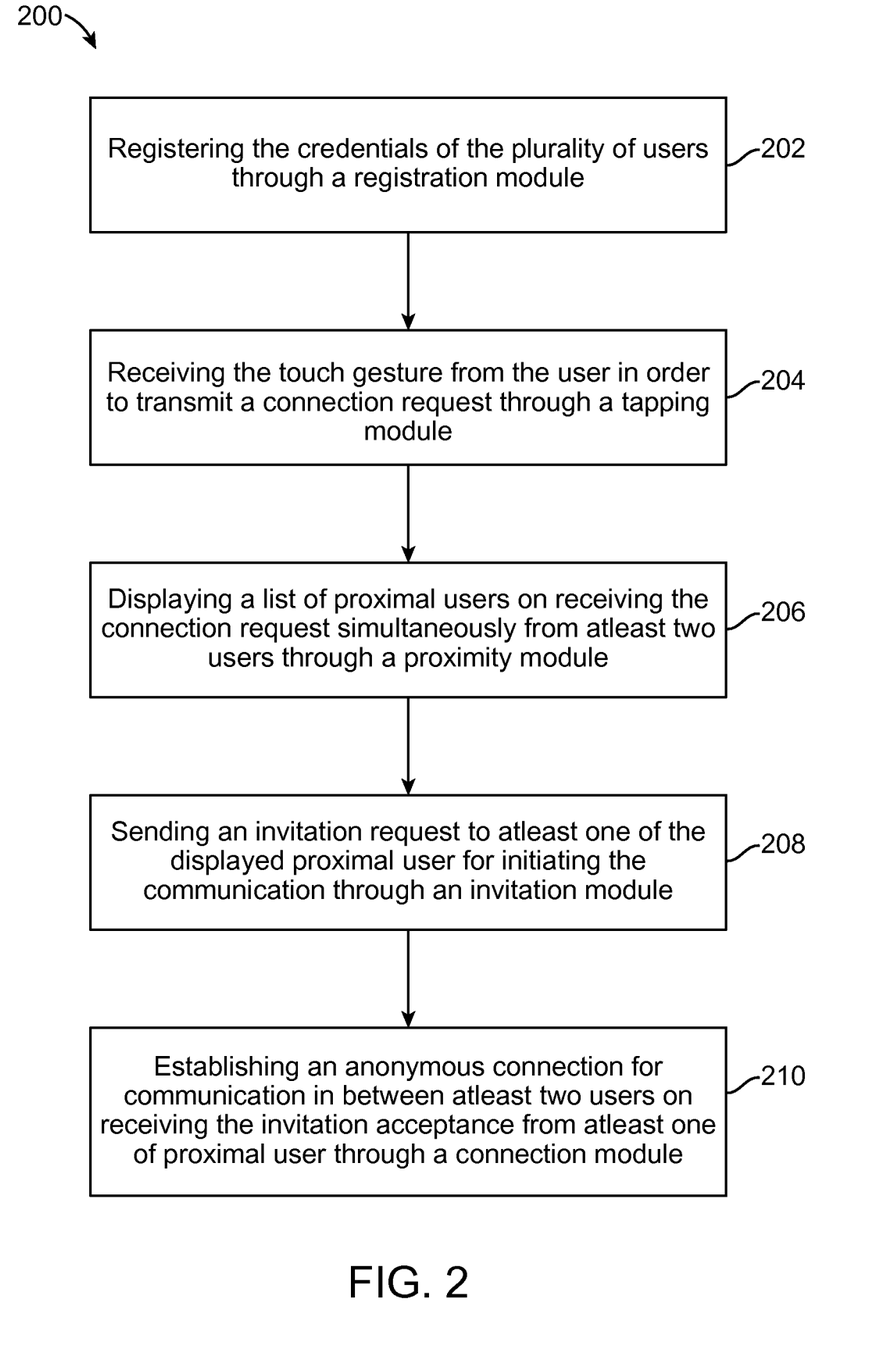
FIG. 2 illustrates a flowchart of a method for location based anonymous communication in between plurality of users over a communication network in accordance with another preferred embodiment of the present invention.

FIG. 2 illustrates a flowchart of a method 200 for location based anonymous communication in between plurality of users over a communication network. The method 200 initiates with a step 202 of registering the credentials of the plurality of users through a registration module. The step 202 is explained in detail in conjunction with FIG. 3 of the present invention.

The step 202 is followed by a step 204 of receiving the touch gesture from the user in order to transmit a connection request through a tapping module. The step 204 is then followed by a step 206 of displaying the list of proximal users on receiving the connection request simultaneously from at least two users through a proximity module. The step 204 and the step 206 are explained in detail in conjunction with FIG. 4 and FIG. 5 respectively.

The step 206 is then followed by a step 208 of sending an invitation request to atleast one of the displayed proximal user for initiating the communication through an invitation module. The step 208 is explained in detail in conjunction with FIG. 6 of the present invention. The step 208 is then followed by a step 210 of establishing an anonymous connection for communication in between atleast two users on receiving the invitation acceptance from atleast one of proximal user through a connection module. The step 210 is explained in detail in conjunction with FIG. 7 of the present invention.

Figure 3:
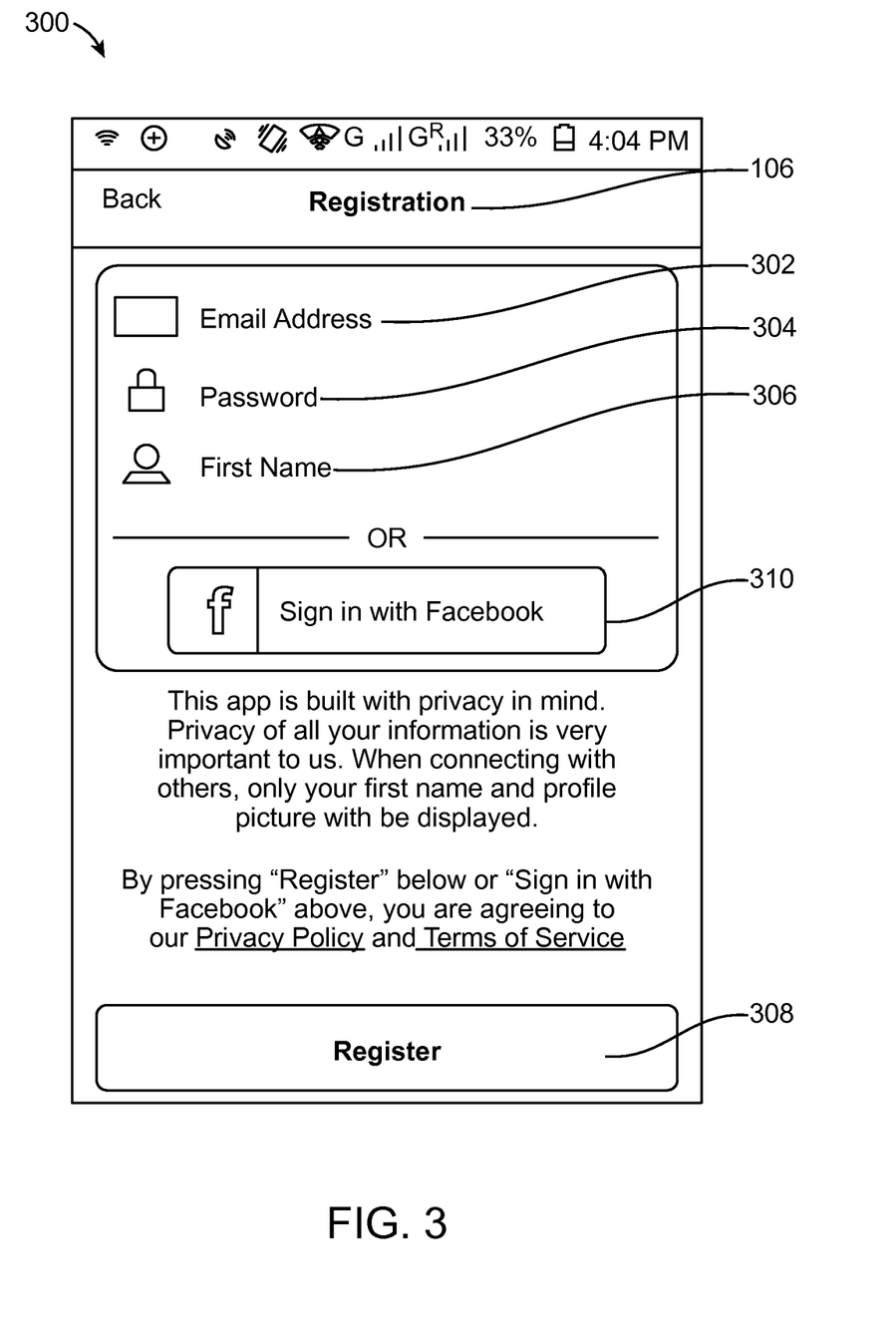
FIG. 3 illustrates a screenshot showing, by way of an example, a UI of a registration module in accordance with an embodiment of the present invention.

FIG. 3 illustrates a screenshot showing, by way of an example, a UI 300 for registering a user on the database through a registration module 106 in accordance with an embodiment of the present invention. The registration module 106 allows the user to register on the database by inputting the credentials. Examples of credential include an email address input option 302 to input email address, a password input option 304 to input password detail and first name input option 306 to input first name of the user. The registration module 106 further includes a register option 308 to register credentials on the database.

The UI 300 allows the user to enter the email address, the password, and a first name respectively for accessing in the database through register option 308. In another embodiment of the present invention, the user may further access in the database by using social media details such as Facebook credentials through social media option 310.

Figure 4:
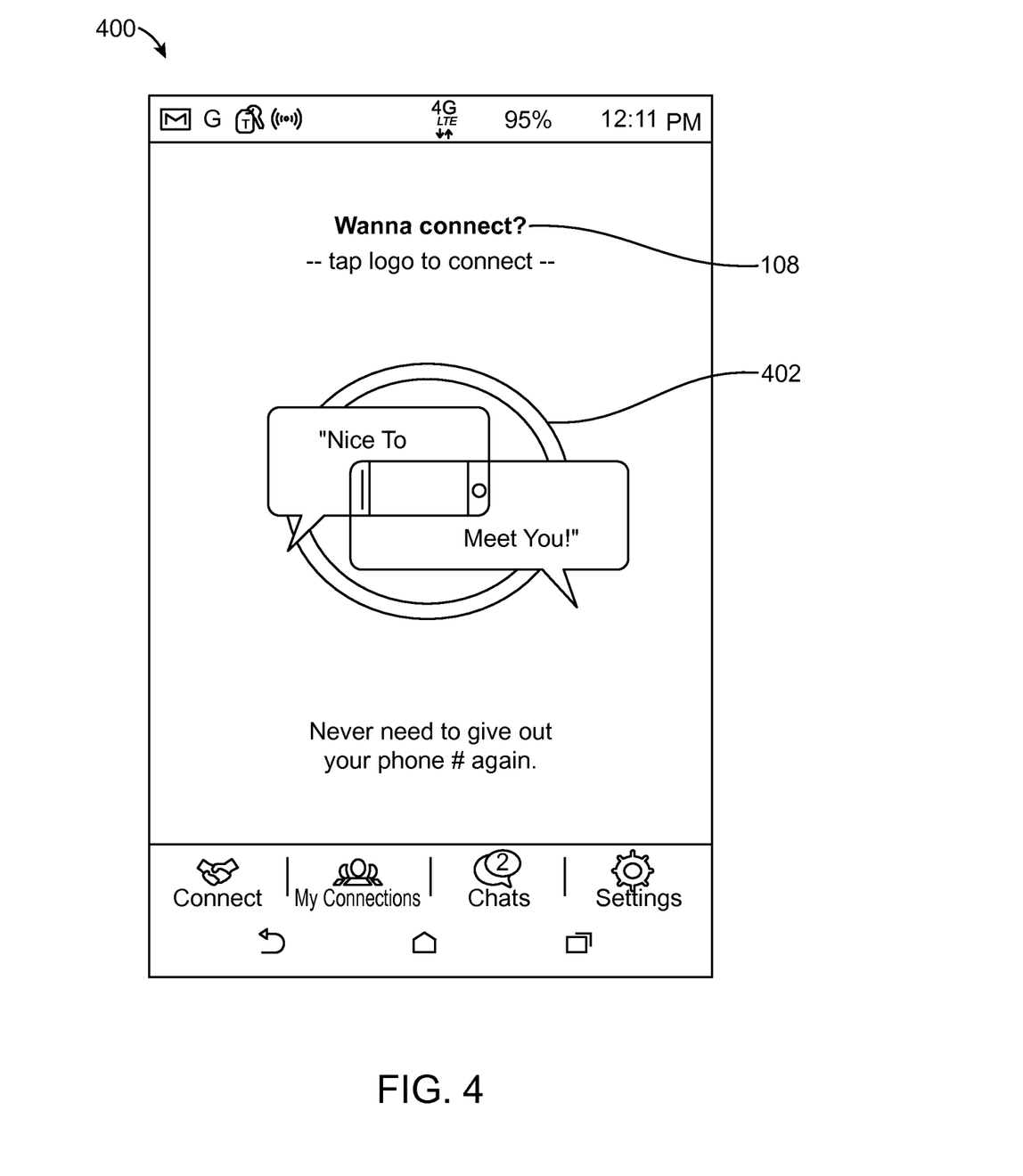
FIG. 4 illustrates a screenshot showing, by way of an example, a UI of a tapping module in accordance with an embodiment of the present invention.

FIG. 4 illustrates a screenshot showing, by way of an example, a UI 400 for showing tapping module 108 in accordance with an embodiment of the present invention. The UI 400 displays the tapping module 108 for receiving the touch gesture from the user in order to send the connection request to the server. The touch gesture includes but not limited to receiving physical touch from the user's finger or touch gesture through stylus.

In an exemplary embodiment of the present invention, the connection is established in between at least two users when the logo module 402 receives the touch gesture from the user. The establishment of the connection in between two users is explained in detail in conjunction with FIG. 5 and FIG. 6 of the present invention.

Figure 5:
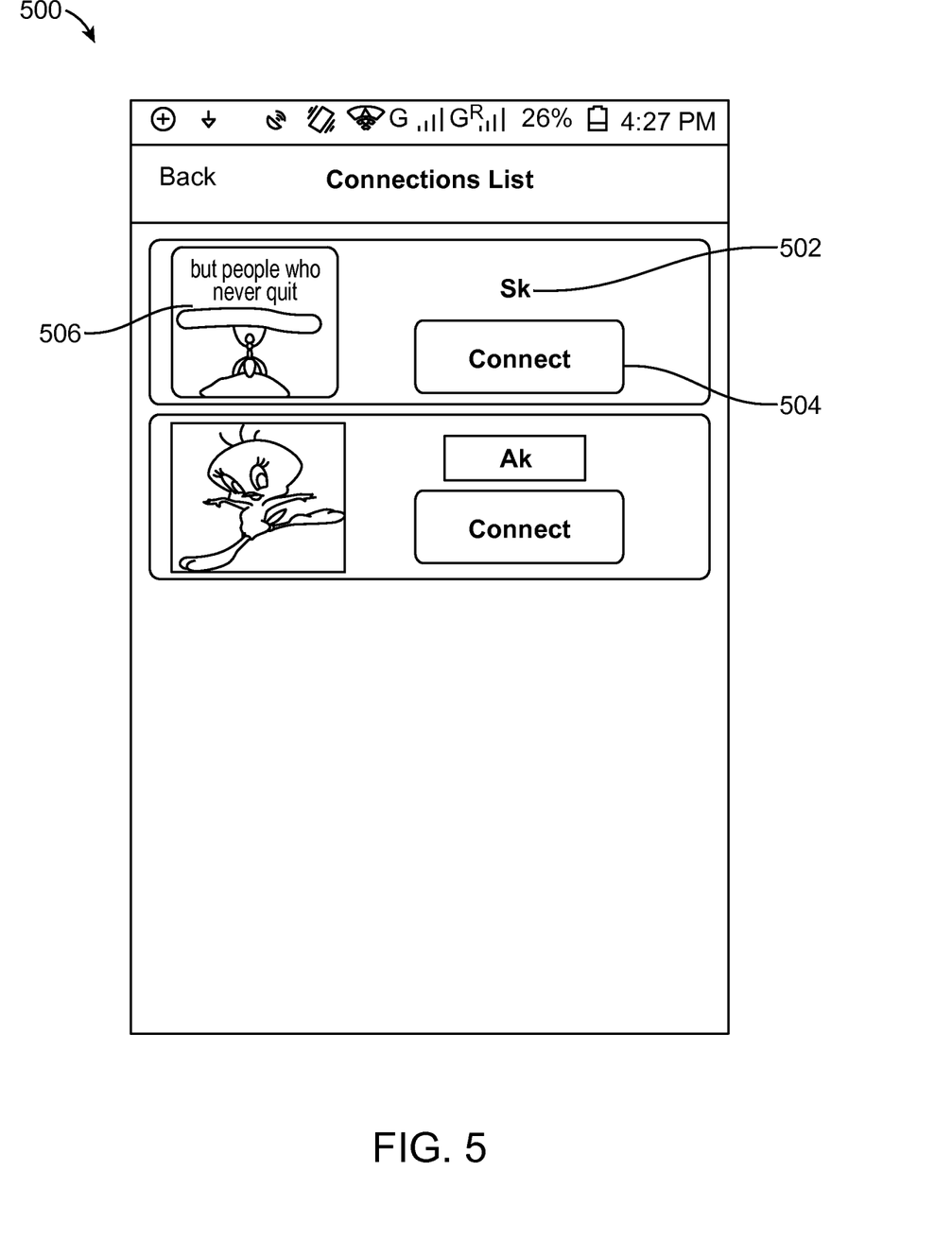
FIG. 5 illustrates a screenshot showing, by way of an example, a UI of a proximity module in accordance with an embodiment of the present invention.

FIG. 5 illustrates a screenshot showing, by way of an example, a UI 500 for showing proximity module 110 in accordance with an embodiment of the present invention. The UI 500 displays the list of proximal users on receiving the connection request simultaneously from at least two users. In a preferred embodiment of the present invention the proximity in between two users for establishing an anonymous connection is five foot. However, it would be readily apparent to those skilled in the art that various proximity distance may be set to establish anonymous connection.

Further, the UI 500 displays the profile name tab 502, a profile photo tab 506 respectively for connecting to proximal users through connect tab 504. The user then selects at least one of the proximal user from the displayed list of proximal users to send the anonymous invite to initiate communication.

The connection in between at least two user may only be established when the touch gesture from the first user and a proximal user is established simultaneously. In case, the user and the proximal user fail to provide the touch gesture simultaneously then the connection is not established.

Figure 6:
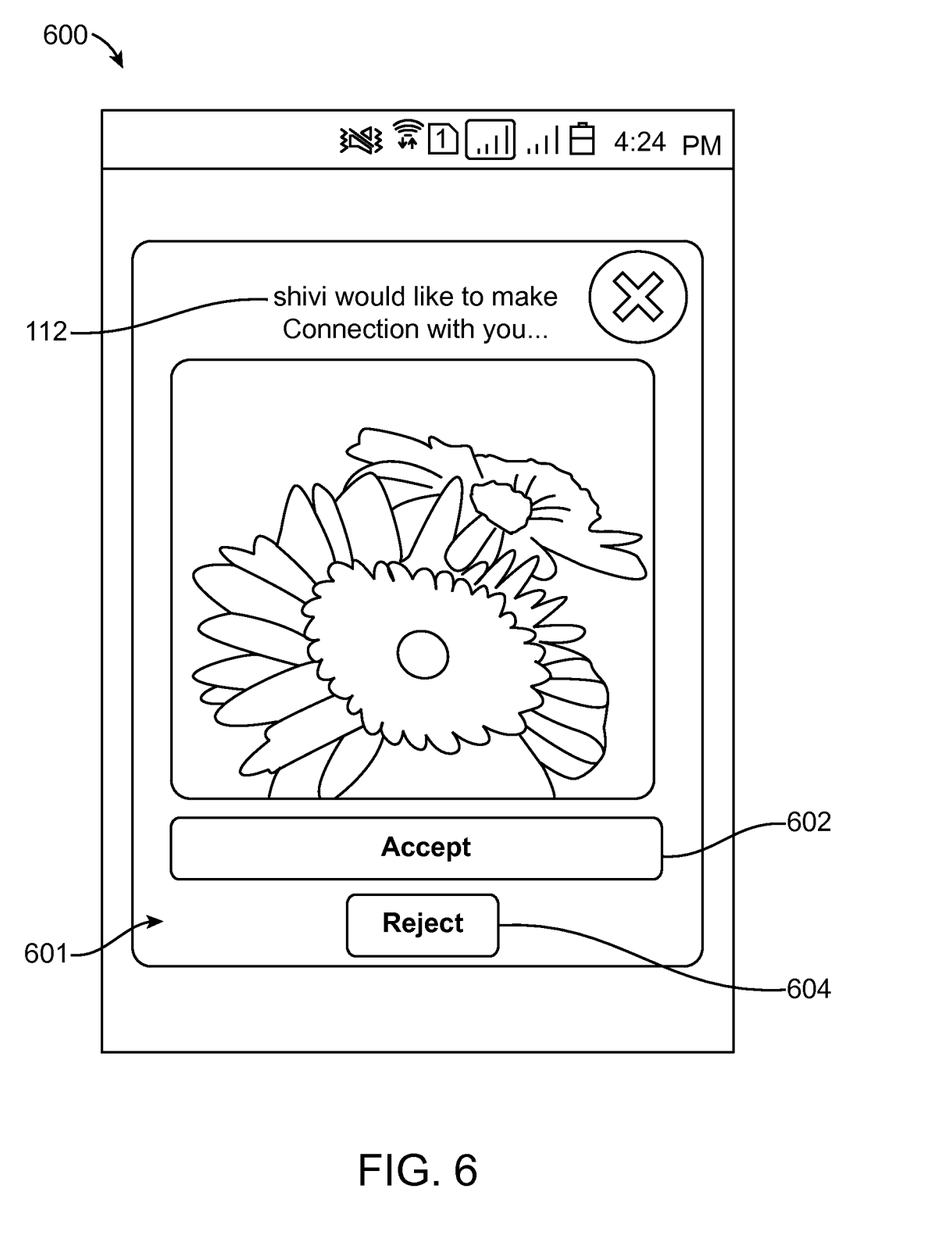
FIG. 6 illustrates a screenshot showing, by way of an example, a UI of invitation module in accordance with an embodiment of the present invention.

FIG. 6 illustrates a screenshot showing, by way of an example, a UI 600 for showing an invitation module 112 in accordance with an embodiment of the present invention. The invitation module 112 sends the invitation request to the user selected from the displayed list of proximal connections to initiate the communication. The user is able to see invitation request from the proximal user on the UI 600. The user then either accepts or declines the invitation request of the proximal user.

In another preferred embodiment of the present invention, the system further includes a responding module 601 to respond to the invitation request from the user. The responding module 601 further includes an accept module 602 and decline module 604 for accepting and declining the request invitation from the proximal user respectively.

Figure 7:
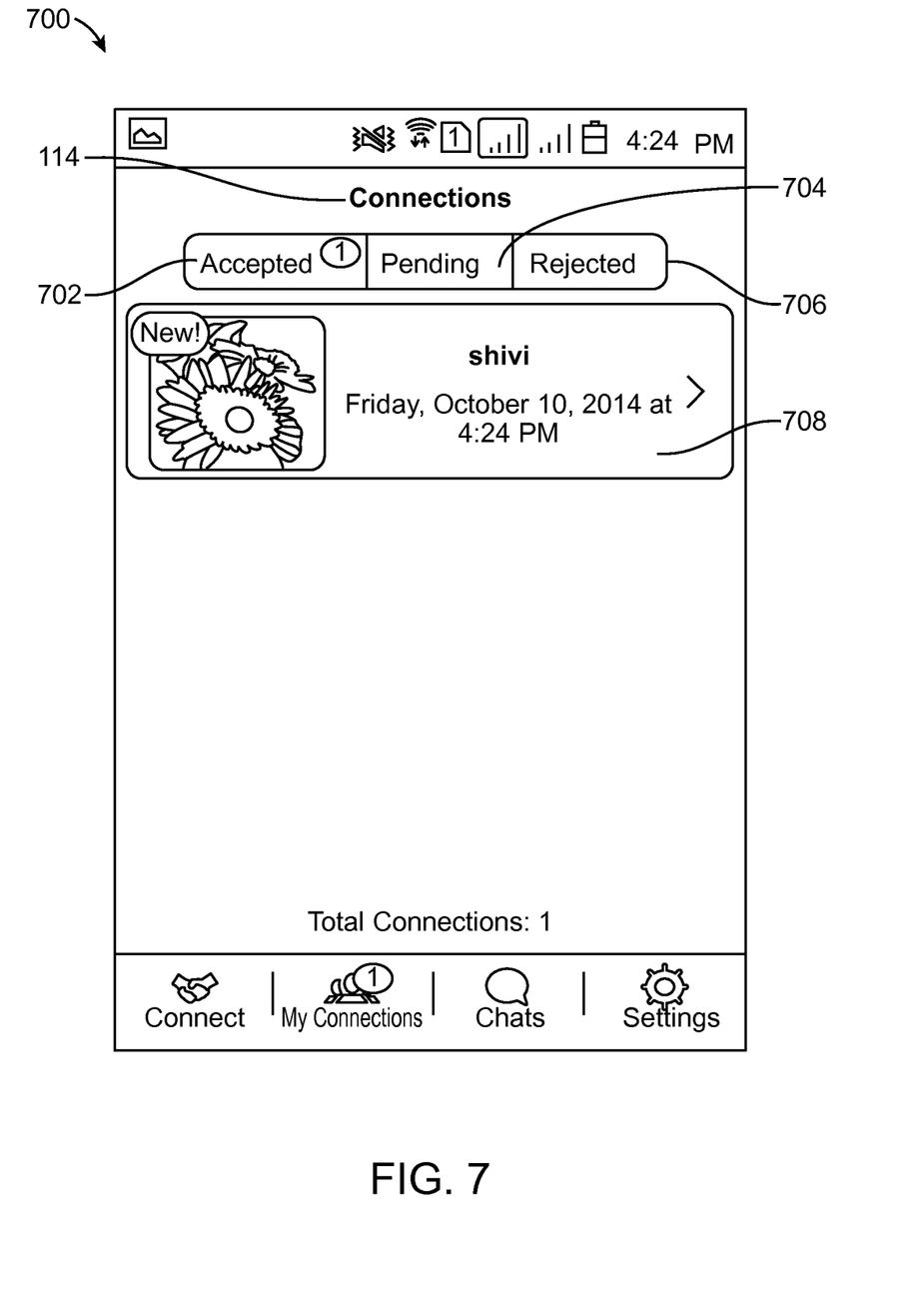
FIG. 7 illustrates a screenshot showing, by way of an example, a UI of accepting module in accordance with an embodiment of the present invention.

FIG. 7 illustrates a screenshot showing, by way of an example, a UI 700 for showing a connection module 114 in accordance with an embodiment of the present invention. The connection module 114 establishes an anonymous connection for communication in between atleast two users on receiving the invitation acceptance from atleast one user.

The connection module 114 further includes an accepted connection tab 702, a pending connection tab 704 to show pending communication request from the proximal users and a rejected connection tab 706 to show rejected communication request from the proximal user. The accepted connection tab 702 displays the list of accepted connections irrespective of sharing the personal information. The UI 700 displays the anonymous new connection 708 in between the two users without showing the contact number. The user may see the profile name, profile photo and the date time at which the anonymous connection for communication made.

Figure 8:
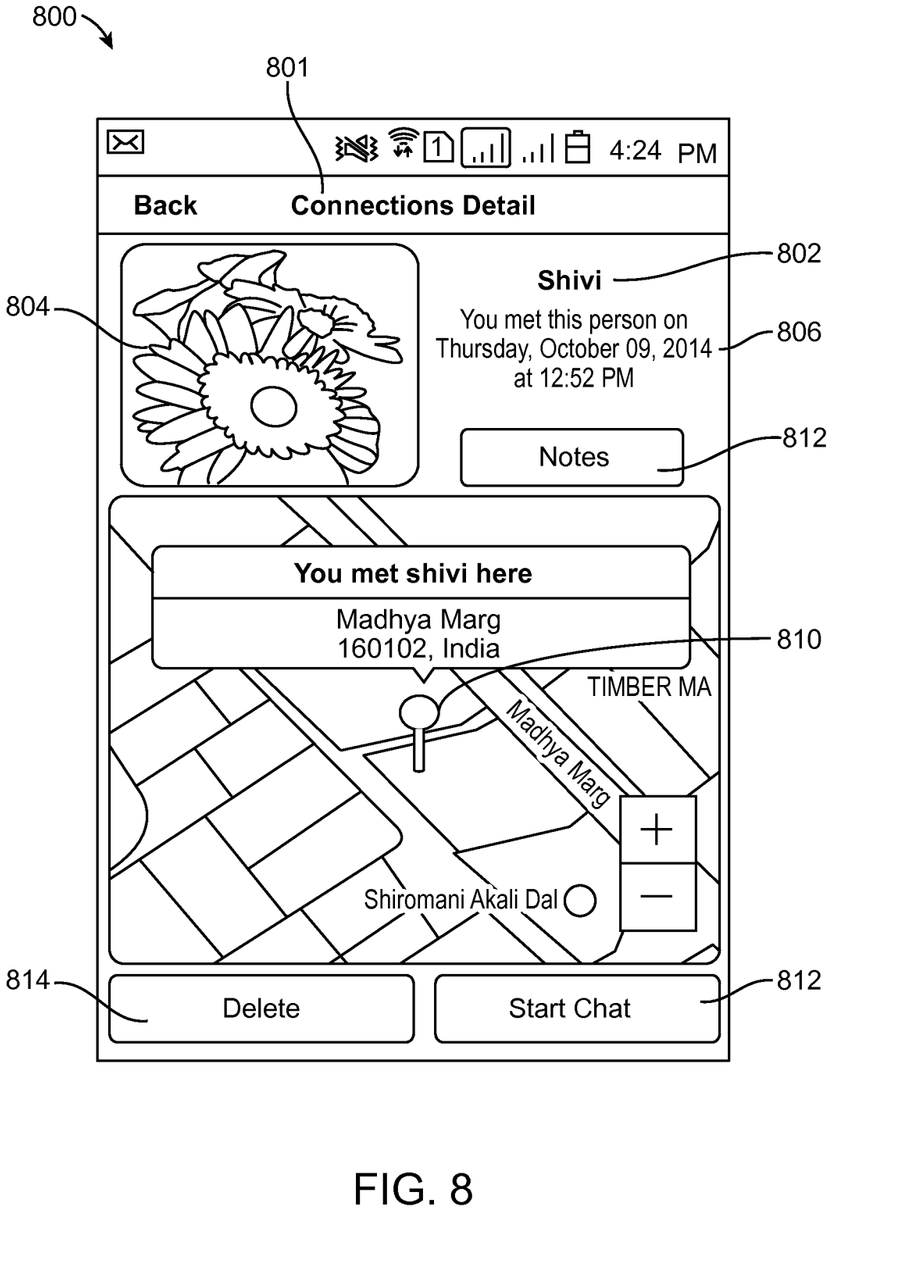
FIG. 8 illustrates a screenshot showing, by way of an example, a UI of proximal profile module in accordance with an embodiment of the present invention.

FIG. 8 illustrates a screenshot showing, by way of an example, a UI 800 for showing a proximal profile module 801 in accordance with an embodiment of the present invention. The proximal profile module 801 displays the connections details of the atleast one connected proximal user over the communication network. The proximal profile module 801 displays the first name 802, the profile photo 804, date time 806 and meeting location 810 of connected user over the map.

The proximal profile module 801 further includes the start chat 812 and delete 814 tabs to start the chat between the connected connections and delete the connected connection for communication respectively. In another embodiment of the present invention, the proximal profile module 801 shows the note module for creating notes to note down the user related information. The user may create multiple notes to store the details of connected users for remembering purpose. The notes may be edited, saved or deleted by the user for own use.

Figure 9:
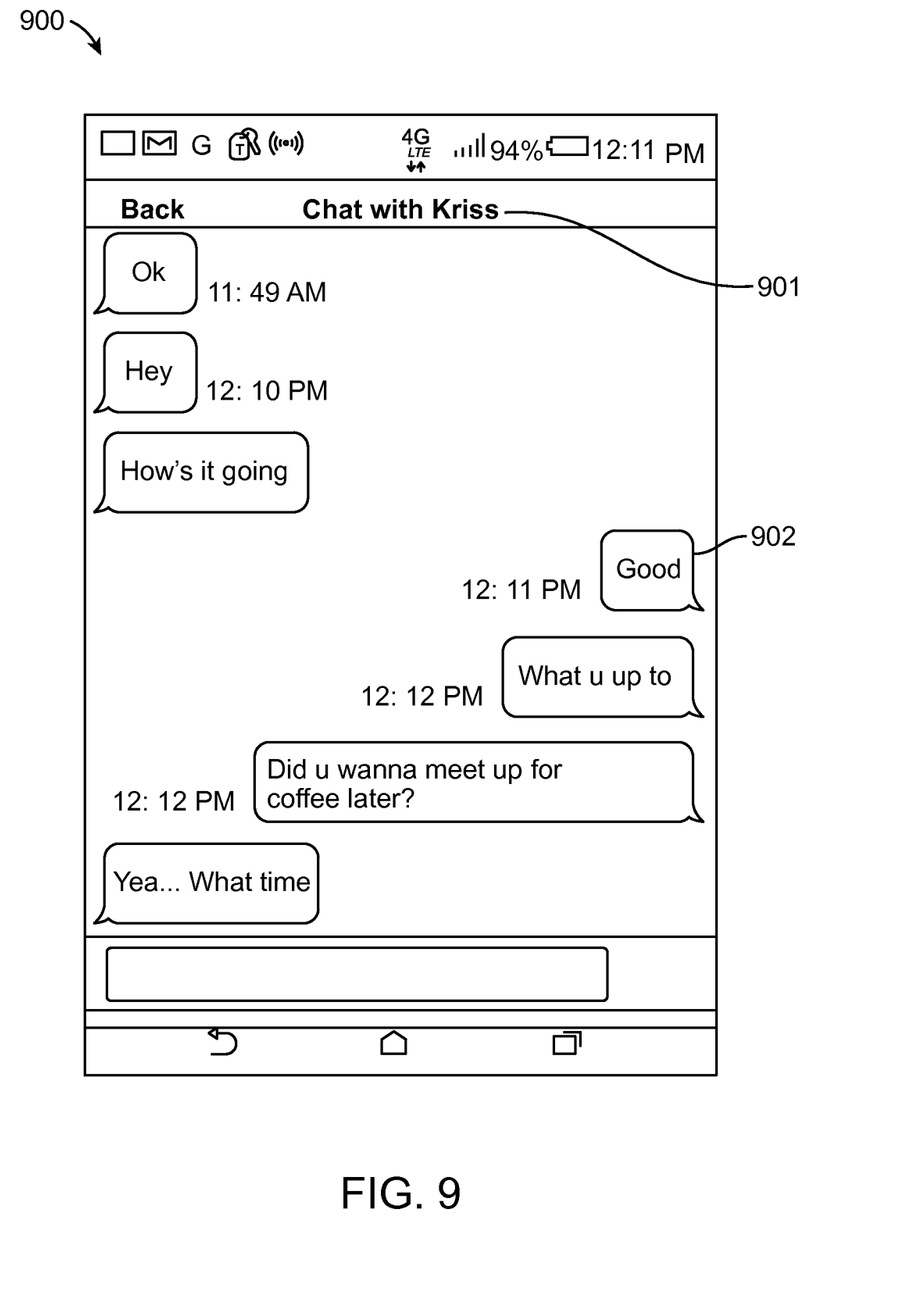
FIG. 9 illustrates a screenshot showing, by way of an example, a UI of communication module in accordance with an embodiment of the present invention.

FIG. 9 illustrates a screenshot showing, by way of an example, a UI 900 for showing a messaging module 901 in accordance with an embodiment of the present invention. The messaging module 901 initiates the communication in between the anonymous connected users by attaching multimedia files. The multimedia files includes but not limited to text, voice, videos, images. The UI 900 displays the text message 902 to start the communication with the connected user without sharing the contact number.

Figure 10:
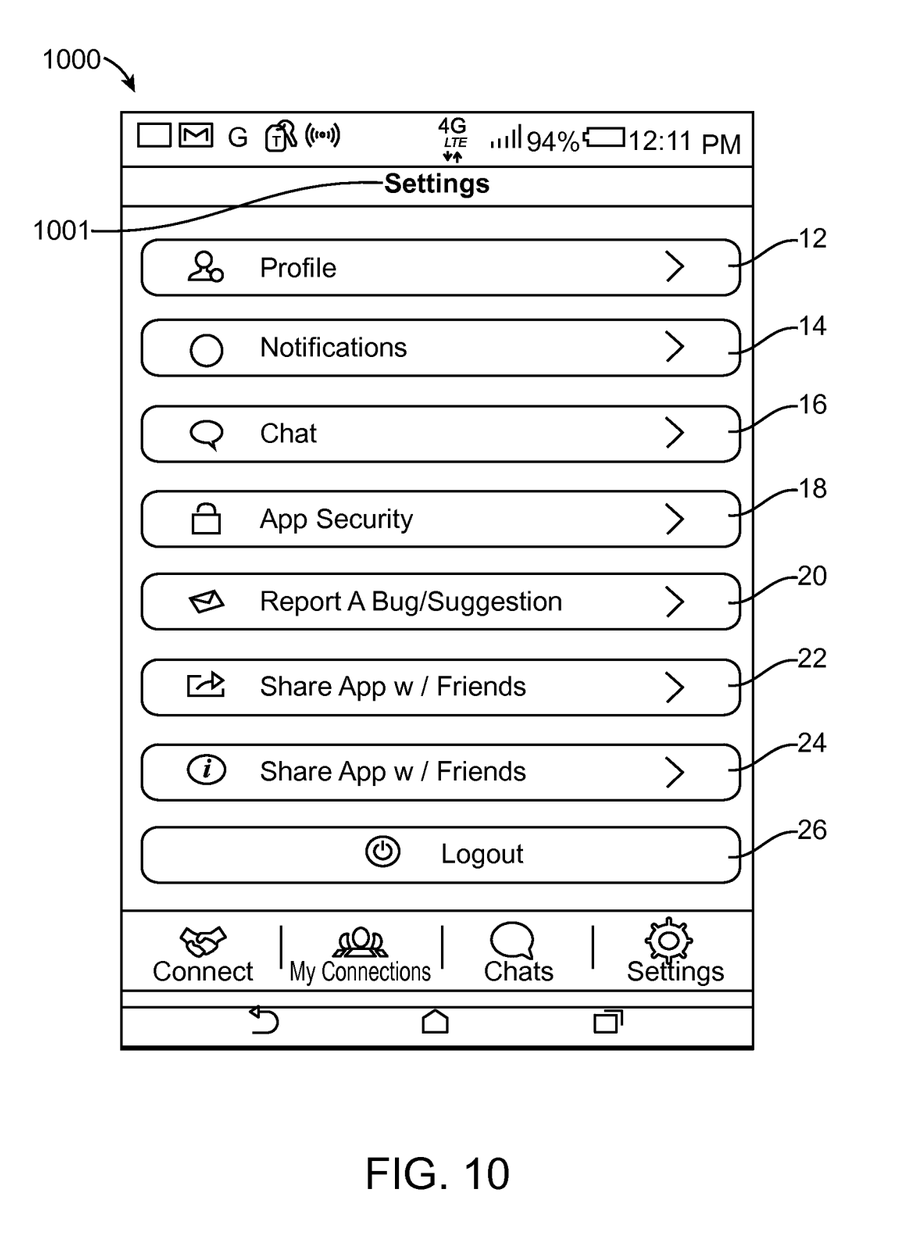
FIG. 10 illustrates a screenshot showing, by way of an example, a UI of settings module in a preferred embodiment of the present invention.

FIG. 10 illustrates a screenshot showing, by way of an example, a UI 1000 for showing a settings module 1001 in accordance with an embodiment of the present invention. The settings module 1001 provides the settings facilities associated with the application. The settings module 1001 includes a profile settings module 12 to change registration details of the user. The registration details include but not limited to first name and profile photo.

The settings module 1001 further includes a notification settings module 14 allows setting of the settings corresponding to the sound of notification. The notifications include text messages, voice messages and video messages. The settings module 1001 further includes a chat setting module 16 adjusts the setting associated with the sound tone produced corresponding to the delivery of messages during chat in between at least two users. The user may select from various sounds as a message sound tone from the database.

The settings module 1001 further includes an app security settings module 18 maintains the security features for allowing the authenticated user to initiate the communication. The security features include but not limited to setting of password. The settings module 1001 further includes a report a bug settings module 20 allows the user to report bug regarding problems arouse while using the application, and further allows the user to input suggestion regarding enhancement of application features through social networking site. The example of social networking site includes but not limited to Facebook, Gmail and twitter.

The settings module 1001 further includes a share app with friends settings module 22 for allowing the user to share the application with family and friends over social networking sites, an about module 24 provides a help menu for assisting the user to make the settings associated with profile settings module 12 and a logout module 26 provides the feature when the user intends to sign off from the account registered in the database.

The present invention offers various advantages such as provides a more private way of connecting when you meet someone for the first time. The present invention provides a way to communicate with that person in the future without needing a traditional piece of contact information—phone number, email, etc. The present invention provides a fast way of connecting users—simply by tapping the logo—the connection process is done within seconds. The present invention provides historical data regarding the first encounter—showing the person's first name, picture, when and where the encounter took place—thus allowing users to more easily remember the encounter.

The foregoing discussion discloses and describes merely exemplary embodiments of the present invention. One skilled in the art will readily recognize from such discussion and from the accompanying drawings that various changes, modifications and variations may be made therein without departing from the spirit and scope of the invention. Therefore, it is intended that the invention not be limited to the particular embodiment disclosed, but that the invention will include all embodiments falling within the scope of the appended claims.

The invention claimed is:

1. A system for location based anonymous communication in between a first user and a second user over a communication network, the system comprising:
   at least one database for storing one or more instructions;
   at least one processor coupled with the database to process the stored instructions;
   at least a first communicating device of the first user;
   at least a second communication device of the second user;
   at least one server, comprising:
      a registration module to register credentials of a plurality of users include the first user and the second user;
      a tapping module to receive a first touch gesture from the first communicating device in order to transmit a first connection request using the communication network to the server;
      the tapping module to receive a second touch gesture from the second communicating device in order to transmit a second connection request using the communication network to the server;
      a proximity module to display the second user on the first communication device and further displays the first user on the second communication device on receiving the first connection request from the first communicating device and the second connection request from the second communicating device at the same time, wherein the first user and the second user are within a predetermined proximity;
      an invitation module to send an invitation request from the first communicating device to the second communicating device for initiating communication on identifying the second user through the proximity module;
      a connection module to establish an anonymous connection for communication in between the first communicating device and the second communicating device on receiving an invitation acceptance from the second user; and
      wherein the first user and the second user's contact information are not exchanged through the anonymous connection.

2. The system according to claim 1, the server further comprising a responding module to receive response of the invitation request from the second communicating device.

3. The system according to claim 2, wherein the responding module further comprising: an accept module to accept the invitation request by the second communicating device; and a decline module to decline the invitation request by the second communicating device.

4. The system according to claim 3, further comprising a messaging module to initiate multimedia messaging in between the first communicating device and the second communicating device.

5. The system according to claim 4, further comprising an attachment module to attach a multimedia file to the messaging module.

6. The system according to claim 1, further comprising a proximal profile module to view profile details of the second user, wherein the profile details of the second users comprising at least one of: a first name; an image; and meeting location of connected users.

7. The system according to claim 1, further comprising a note module to create one or more notes by the first user to note down the second user related information.

8. The system according to claim 1, further comprising at least one of:
   a profile settings module for changing registration details of the users;
   a notification settings module for configuring settings corresponding to notification sound from connected user;
   a chat settings module for adjusting the sound settings associated with sound tone produced corresponding to messages delivery during chat in between at least two users;
   an app security settings module for maintaining security features for allowing an authenticated user to initiate the communication;
   a report a bug settings module for reporting bug regarding problems and inputting suggestion regarding enhancement of application features through social networking site; and
   a logout module for signing off from registered account of the user.

9. A method for location based anonymous communication in between a first user and a second user over a communication network, the method comprising:
   registering, using a registration module at a server, credentials of a plurality of users include the first user and the second user;
   receiving, by a tapping module, a first touch gesture from a first communicating device of the first user in order to transmit a first connection request using the communication network to the server;
   receiving, by the tapping module, a second touch gesture from a second communicating device of the second user in order to transmit a second connection request using the communication network to the server;
   displaying, by a proximity module, the second user on the first communication device and further displays the first user on the second communication device on receiving the first connection request from the first communicating device and the second connection request from the second communicating device at the same time, wherein the first user and the second user are within a predetermined proximity;

sending, by an invitation module, an invitation request from the first communicating device to the second communicating device for initiating communication on identifying the second user through the proximity module;

establishing, by a connection module, an anonymous connection for communication in between the first communicating device and the second communicating device on receiving an invitation acceptance from the second user; and wherein the first user and the second user's contact information are not exchanged through the anonymous connection.

10. The method according to claim 9, further comprising: receiving, by a responding module, response of the invitation request from the second communicating device.

11. The method according to claim 10, wherein the responding module further comprising: accepting, by an accept module, the invitation request by the second communicating device; or declining, a decline module, the invitation request by the second communicating device.

12. The method according to claim 11, further comprising: initiating, by a messaging module, multimedia messaging in between the first communicating device and the second communicating device.

13. The method according to claim 12, further comprising: attaching, by an attachment module, a multimedia file to the messaging module.

14. The method according to claim 9, further comprising: viewing, by a proximal profile module, profile details of the second user, wherein the profile details of the second users comprising at least one of: a first name; an image; and meeting location of connected users.

15. The method according to claim 9, further comprising: creating, by a note module, one or more notes by the first user to note down the second user related information.

16. The method according to claim 9, further comprising at least one of:

changing, by a profile settings module, registration details of the users;

configuring, by a notification settings module, settings corresponding to notification sound from connected user;

adjusting, by a chat settings module, sound settings associated with sound tone produced corresponding to messages delivery during chat in between at least two users;

maintaining, by an app security settings module, security features for allowing an authenticated user to initiate the communication;

reporting, by a report a bug settings module, bug regarding problems and inputting suggestion regarding enhancement of application features through social networking site; and signing off, by a logout module, from registered account of the user.

* * * * *